(12) United States Patent
Wang et al.

(10) Patent No.: US 12,335,627 B2
(45) Date of Patent: Jun. 17, 2025

(54) INSPECTION CAMERA CONTROLLER SEQUENCE

(71) Applicant: UnitX, Inc., Santa Clara, CA (US)

(72) Inventors: Boyun Wang, Santa Clara, CA (US); Weixiong Zheng, Santa Clara, CA (US); Kedao Wang, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 135 days.

(21) Appl. No.: 17/981,380

(22) Filed: Nov. 4, 2022

(65) Prior Publication Data

US 2024/0155247 A1    May 9, 2024

(51) Int. Cl.
*H04N 23/72* (2023.01)
*G06T 7/00* (2017.01)

(52) U.S. Cl.
CPC ........... *H04N 23/72* (2023.01); *G06T 7/0004* (2013.01); *G06T 2200/24* (2013.01); *G06T 2207/10144* (2013.01); *G06T 2207/10152* (2013.01)

(58) Field of Classification Search
CPC ........ H04N 23/72; H04N 23/56; H04N 23/60; G06T 7/0004; G06T 2200/24; G06T 2207/10144; G06T 2207/10152
USPC .......................................................... 348/92
See application file for complete search history.

(56) References Cited

U.S. PATENT DOCUMENTS

| | | | |
|---|---|---|---|
| 11,734,812 B2 | 8/2023 | Wang | |
| 11,763,442 B2 | 9/2023 | Wang | |
| 2020/0272770 A1* | 8/2020 | Koyuncu | G06F 21/73 |
| 2020/0364840 A1* | 11/2020 | Kurihara | G06T 7/001 |
| 2020/0412932 A1* | 12/2020 | Naruse | G06T 7/0004 |
| 2021/0150700 A1 | 5/2021 | Wang | |
| 2021/0342688 A1 | 11/2021 | Wang | |

(Continued)

FOREIGN PATENT DOCUMENTS

| | | |
|---|---|---|
| KR | 20110058219 | 6/2011 |
| KR | 102112053 | 5/2020 |

(Continued)

OTHER PUBLICATIONS

"International Application Serial No. PCT US2023 068801, International Search Report mailed Oct. 25, 2023", 3 pgs.

(Continued)

*Primary Examiner* — Loi H Tran
(74) *Attorney, Agent, or Firm* — Schwegman Lundberg & Woessner, P.A.

(57) ABSTRACT

In an example embodiment, a controller and computer system are provided for a lighting apparatus. More particularly, users are able to use the computer system to define a sequence of one or more capture configurations. Each capture configuration includes identification(s) of one or more light sources to illuminate during an image capture, one or more channels to use to capture the image, and an exposure time. Each sequence can further define custom delays between capture configurations within the sequence. Upon receipt of a trigger from either hardware or software, the controller then fires the stored sequence, which takes images based on the captured configurations (and delays). Artificial intelligence techniques can then be applied to the captured images to identify suspected defects in components captured in the images.

20 Claims, 7 Drawing Sheets

(56) References Cited

U.S. PATENT DOCUMENTS

| | | |
|---|---|---|
| 2022/0301144 A1 | 9/2022 | Wang |
| 2022/0301145 A1 | 9/2022 | Wang |
| 2024/0043141 A1* | 2/2024 | Hashimoto ........... G06T 7/0002 |

FOREIGN PATENT DOCUMENTS

| | | | |
|---|---|---|---|
| KR | 20220065518 | 5/2022 | |
| WO | WO-2022215429 A1 * | 10/2022 | ............. B64C 27/08 |

OTHER PUBLICATIONS

"International Application Serial No. PCT US2023 068801, Written Opinion mailed Oct. 25, 2023", 4 pgs.

"International Application Serial No. PCT US2023 026625, International Preliminary Report on Patentability mailed May 15, 2025", 6 pgs.

* cited by examiner

INSPECTION CAMERA CONTROLLER SEQUENCE

TECHNICAL FIELD

This application relates generally to inspection cameras. More particularly, this application relates to a sequence for controlling an inspection camera and lighting system.

BACKGROUND

Inspection cameras are used in industrial products to aid in detecting defects in manufactured products. For example, if a manufacturer is producing metal castings, one or more inspection cameras may be placed in a manufacturing and/or assembly line to inspect the produced metal castings, or portions thereof, to detect any issues with quality control. However, when capturing images, a particular light source may not be conducive for imaging a product having a particular surface, a particular defect, and/or a particular environment. For example, surface materials or characteristics on products that affect light quality of a captured image include reflective qualities, transparent qualities, or black/opaque qualities. In another example, some types of defects may be difficult to detect, such as scratches or dirt. In another example, some environments are more challenging to detect product defects in.

DETAILED DESCRIPTION

Figure 1:
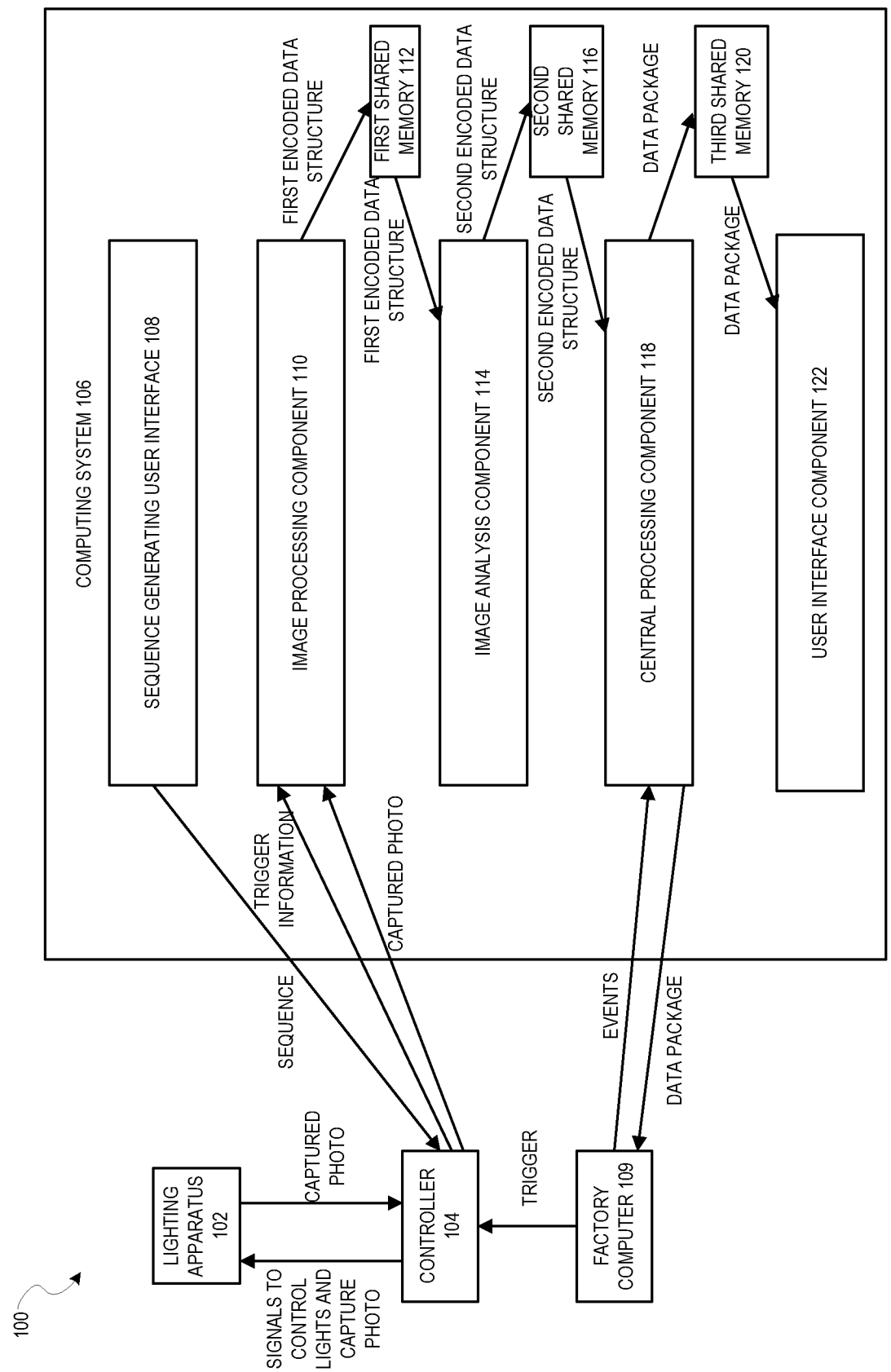
FIG. 1 is a block diagram illustrating an inspection camera systems, in accordance with an example embodiment.

An inspection camera may be improved by improving the design of a lighting apparatus to increase light in various scenarios. More particularly, rather than a single light source, which provides inadequate light for capturing an image with quality sufficient to ascertain the existence of surface defects on all surface materials on various components or products, a lighting apparatus having multiple light sources may be provided. Furthermore, a controller for the lighting apparatus may be provided that allows for the multiple light sources to be independently controlled, allowing for lighting combinations and sequences to be utilized to maximize the flexibility of the lighting apparatus to provide sufficient light for a number of different products, components, materials, and environments.

Managing the various different lighting combinations and sequences, however, creates a technical challenge. There may be many different components in a single assembly or manufacturing line, as well as a variety of different potential defects on the surface, and a variety of different environmental scenarios that might alter the ability of the lighting apparatus to properly produce an image useful for analysis. Furthermore, as the number of different controllable lights on the lighting apparatus increases, the technical challenge becomes exponentially more difficult.

In certain applications, especially high-speed capture when an inspected part is moving with multiple images taken, precise timing and software events sorting is a challenge. For example, when image processing latency is longer than the time between two captures, a second image capture may occur prior to the first image being completely processed. Prior art machine learned models do not support high efficiency event sorting function, and thus are unable to support fast inspecting.

In an example embodiment, a controller and computer system are provided for a lighting apparatus that addresses this technical challenge. More particularly, users are able to use the computer system to define a sequence of one or more capture configurations. Each capture configuration includes identification(s) of one or more light sources to illuminate during an image capture, one or more channels to use to capture the image, and an exposure time. Each sequence can further define custom delays between capture configurations within the sequence.

Upon receipt of a trigger from either hardware or software, the controller then fires the stored sequence, which triggers the camera to take images based on the captured configurations (and delays). Artificial intelligence techniques can then be applied to the captured images to identify suspected defects in components captured in the images.

The description that follows includes illustrative systems, methods, techniques, instruction sequences, and computing machine program products that have illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 is a block diagram illustrating an inspection camera system 100, in accordance with an example embodiment. The inspection camera system 100 may include a lighting apparatus 102, a controller 104, and a computing system 106. The lighting apparatus 102 includes a plurality of different lights, such as Light Emitting Diode (LED) lights that are separately controllable by the controller 104. This means that the lights can be turned on and off independently of one another, allowing the lighting apparatus 102 to have some, but not all, of its lights on at any given time. In some example embodiments, the brightness of each of the lights can also be independently controlled, so that a light can have a custom level of brightness/dimness in addition to merely being on or off.

The lighting apparatus 102 further may include one or more cameras. Each of these cameras can also be independently controlled to take pictures/capture images when signaled. Variables can also be independently controlled. These variables may include any software-definable parameters of the imaging system including, but not limited to, aperture and/or focus of the lens, exposure time of the camera, phase and/or pattern of the diffuser, wavelength and/or intensity of the light, and so on.

In an example embodiment, the lighting apparatus 102 is a light dome. The light dome in use illuminates a target object, such as a metal casting or other product. The light dome includes a housing containing a number of light sources as will be described in more detail below. In some examples, the light sources comprise a plurality of LEDs or display screens arranged to provide flexibility in illuminating the target object.

The one or more cameras, which may be mounted to the light dome by a bracket, captures images of the illuminated target object through a hole in the top of the light dome.

The controller 104 is an electronic component that is designed to send signals to the lighting apparatus 102 via one or more channels to control the lights on the lighting apparatus 102.

The computing system 106 includes a variety of different software components, running on a computing hardware platform. These components include a sequence generating user interface 108. The sequence generating user interface 108 allows a user to create a sequence as an ordered combination of capture configurations, optionally separated by customized delays. The created sequence may then be stored on the controller 104, such as in a memory component in the controller 104. Upon receipt of an external trigger, the controller 104 then retrieves the sequence and fires the sequence, meaning the capture configurations in the sequence are used to control the lighting apparatus 102 according to the parameters defined in each capture configuration, separated by the custom delays.

The external trigger may be either a hardware trigger (such as from a programmable logic controller) or a software trigger (such as from an industrial personal computer). In some example embodiments, one or more of the triggers may be received from a factory computer 109. Once the trigger occurs, the sequence fires, which controls the lighting apparatus 102 to light the appropriate lights at the appropriate time and also to trigger the camera or cameras to take pictures/capture images at the appropriate times.

The controller 104 sends information about the trigger to an image processing component 110 on the computing system 106. The image processing component 110 also uses the system timestamp at the moment it receives the information about the trigger to record a time for the receipt of the trigger. The controller 104 also receives the photo(s) from the lighting apparatus 102, timestamps them, and sends the timestamped images to the image processing component 110. The image processing component 110 then encodes a data package, which includes photo(s), capture configuration information, timestamps, camera identifications, and other information, in a data structure or data structures, which is/are then stored in first shared memory 112.

An image analysis component 114 then retrieves this data structure and decodes it. The capture configuration information is used to retrieve an artificial intelligence model corresponding to the capture configuration. Each capture configuration has its own artificial intelligence model, although some capture configurations may have more than one artificial intelligence model. In an example embodiment, no artificial intelligence model is shared between or among two or more capture configurations.

The artificial intelligence model acts to use artificial intelligence to perform one or more image analysis tasks on the image(s). These tasks may include, for example, creating a mask for the image that makes one or more inferences on the image regarding one or more defects in components captured in the image. The artificial intelligence may be accomplished by using a machine learning algorithm to train a machine learning model.

In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

The image analysis component 114 then encodes the results of these image analysis tasks into another data structure. This data structure may include, for example, inferred masks, network information, and defect types. This data structure is then stored in a second shared memory 116.

A central processing component 118 then retrieves the data structure from the second shared memory 116 and performs timestamp sorting on the data in the data structure, using information obtained from the programmable logic controller, such as part identification, inspection identification, inspection ready, part start, part end, etc. It then packages the sorted data into a data package that is stored in a third shared memory 120. The data package may include, for example, a part identification, inspection identification, camera identification, image, inference mask, other inference post-processing results, error codes, and the like.

A user interface component 122 then is provided that can access the data package in the third shared memory 120 and display portions of it to a user via a graphical user interface. Here, a user may specify an inspection mode (such as manual or automatic), and can also add customer-specific settings, such as image display settings, how and whether to upload the image into a cloud environment, etc.:).

It should be noted that in some example embodiments, the user interface component 122 and the user interface 108 may be combined into a single component. In other words, the sequence defining capabilities of the user interface 108 may be combined with the output and settings-related capabilities of the user interface component 122

Figure 2:
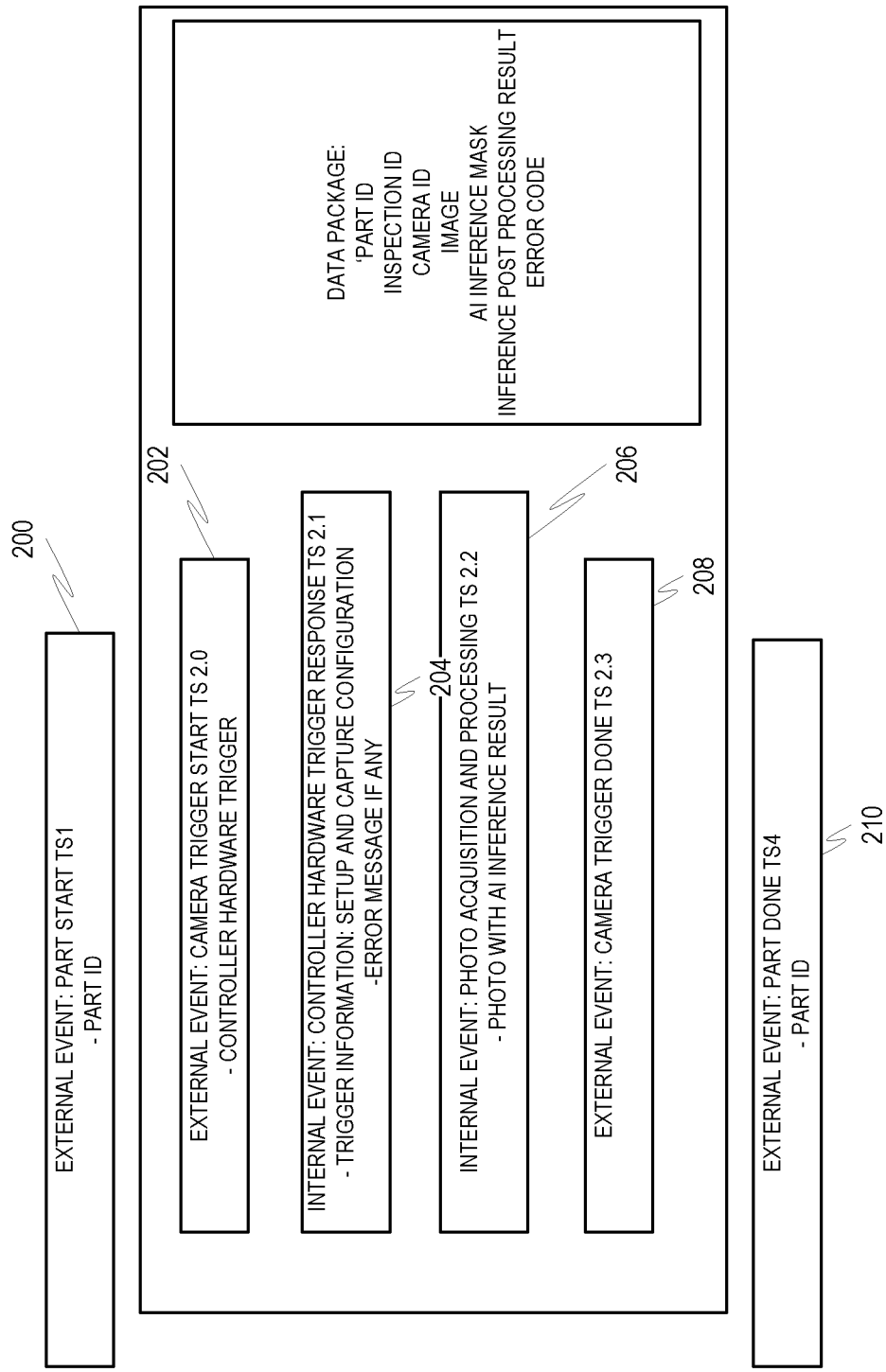
FIG. 2 is an example of events sorted by a combination of their initial trigger and timestamps, in accordance with an example embodiment.

Referring now back to the timestamp sorting performed by the central processing component 118, it should be noted that many of the operations described above can be performed in parallel. For example, the inspection camera system 100 may still be processing an image captured from a previous trigger when a new trigger is received to cause another image to be captured. As a result, events, both external and internal, can be received constantly and may be difficult to track. To aid in tracking and managing these events, the central processing component 118 can sort events based on a combination of their initial trigger and timestamps. FIG. 2 is an example of events sorted by a combination of their initial trigger and timestamps, in accordance with an example embodiment. Here, a "part start" external event 200 for a particular part identification is received with a timestamp of "TS1." This indicates that a part start event was received from an external component (e.g., factory computer 109) at time 1. Then, a "camera trigger" external event 202 for that same part identification is received with a timestamp of TS 2.0. This indicates that the controller 104 triggered the lighting apparatus 102 to begin taking the picture (in accordance with a sequence being processed by the controller 104) at time 2.0.

Then a "trigger response" internal event 204 is received with a timestamp of TS 2.1. This indicates that the controller sent back a response acknowledging the camera trigger at time 2.1. Also contained in this event is the trigger information, such as the sequence and capture configuration, as well as any error messages.

Then a "photo acquisition and processing" internal event 206 is received with a timestamp of TS 2.2. This indicates that a photo was taken and processed at time 2.2. Also contained in the event is the photo itself, as well as any AI inference result(s). Then a "camera trigger done" external event 208 is received with a timestamp of TS 2.3. This indicates that the controller 104 has indicated that the camera trigger operation has been completed at time 2.3.

Finally, a "part done" external event 210 is received with a timestamp of TS 4. This indicates that a part done event was received from an external component (e.g., factory computer 109) at time 4.

Notably, all the events 200-210 have been organized such that they are all grouped by part identification, and within the events for that part identification, all sorted by timestamp chronologically. This is true regardless of when the events are actually received. Due to parallel processing and delays, certain events may be received and processed at different times than their timestamps may indicate. For example, it is possible that event 206 is actually received prior to event 204 being received, due to a communication or processing delay. The timestamp sorting corrects for all that, and also organizes the events based on part identification (to handle cases where events for different parts are being received in an interleaved fashion due to parallel processing). Events 202-208 may then be used to obtain the information used to create data package 212 for that corresponding part identification.

Figure 3:
FIGS. 3 and 4 are screen captures illustrating a user interface in accordance with an example embodiment.
Figure 4:
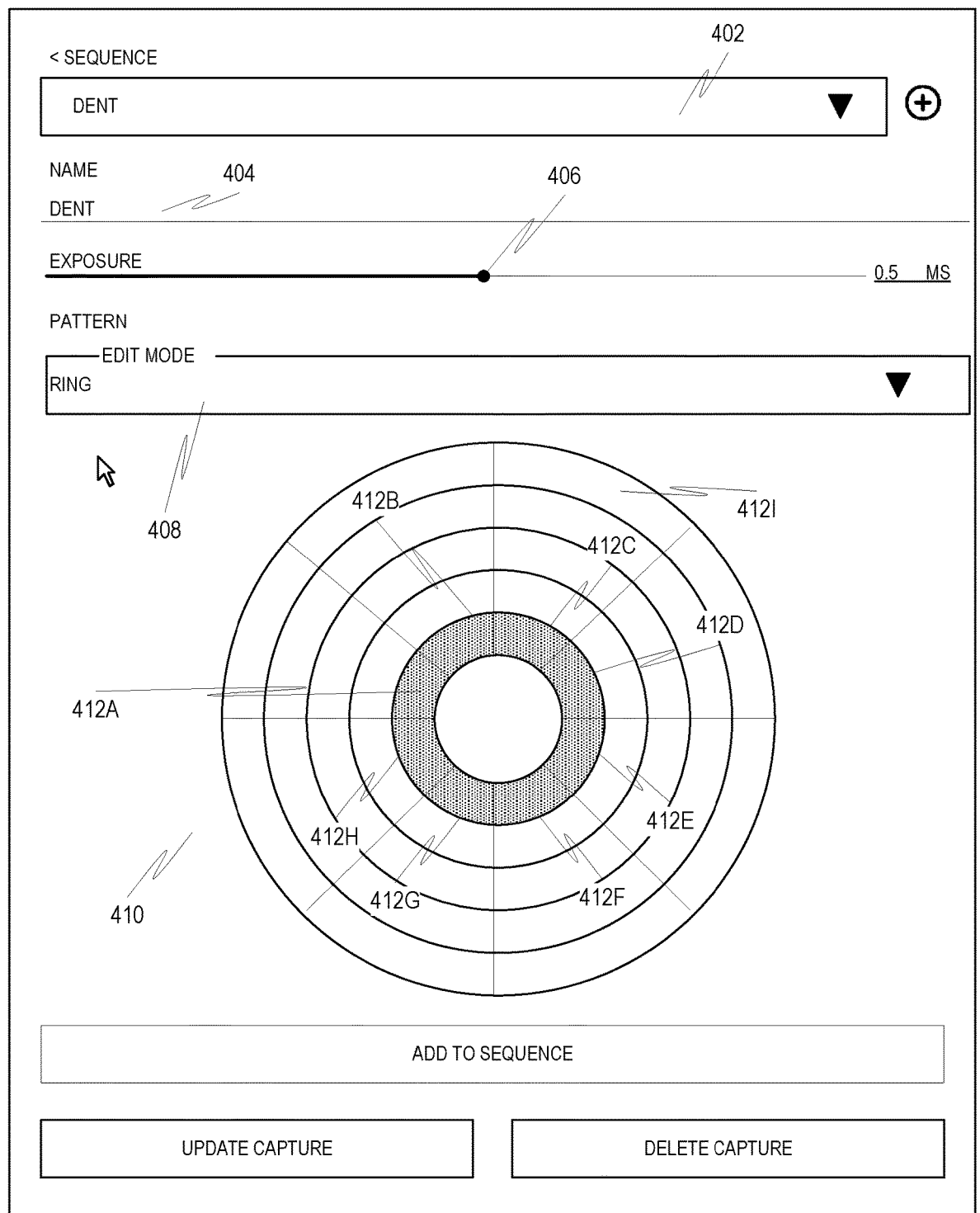

As mentioned earlier, user interface 108 provides a mechanism by which a user can specify capture configurations, including lighting combinations. FIGS. 3 and 4 are screen captures depicting such a mechanism. Specifically, referring first to FIG. 3, user interface 300 displays a screen where a user can name/select a sequence name 302, as well as name/create various capture configurations 304A-304H. While not pictured here, the user can also specify custom delay times between one or more of the capture configurations 304A-304H. Each sequence has a number of capture configurations that are processed in order. Thus, in the example depicted here, capture configuration 304A is fired before capture configuration 304B, and so on.

Referring to FIG. 4, user interface 300 also displays a screen where an individual capture configuration can be modified. Here, the capture configuration can be selected using drop down 402 and its name is depicted at field 404. An exposure time can be specified using slider 406. The drop-down 408 selects the edit mode. When ring is selected as the edit mode, on the click of the pattern, an entire ring will be toggled on and off. When a different edit mode is selected, such as single light source, then only a single light source will be toggled on or off upon clicking. Here, the user has selected the pattern "ring", and the ring pattern is depicted in lighting diagram 410, where LEDs 412A-412H are depicted as "lit" while other LEDs, such as LED 4121, are depicted as "not lit".

The user can also select different individual or combinations of LEDs to be "lit" in the capture configuration. The system may default, when in a ring pattern, to select all LEDs around a selected ring when any LED in that ring is selected. Here, there are 5 possible rings, and if any LED in a ring is selected by the user then all LEDs in that ring are selected. Here, for example, the user may have selected LED 412B to be lit, which selects the entire ring, and thus causes all LEDs 412A-412H within that ring to be selected to be lit. The user can select any combination or number of rings to be lit simultaneously.

Additionally, while not pictured, in some example embodiments, the user interface 300 may add a live camera feed from the corresponding camera. If the user, for example, puts a component in the lighting apparatus 102, then the user is able to see, in real time, how that component is lit based on the changes they are making to the lighting combinations in the user interface 300.

Data that can be Forwarded for Each Image:

```
{
  "part id": <string>,
  "image_timestamp": <number>,
  "ok": <boolean>,
  "result": <string>,
  "ng_types": [string],
  "sequence": <string>,
  "capture config": <string>,
  "capture_index": <number>,
  "camera_id": <string>,
  "network_results": {
    (network name): {
      # Defect network only
      "ng_stats": [{
        "name": <string>,
        "color": <string>,
        "ng": <boolean>,
        "result": <string>,
        "count": <number>,
        "segments": [{
          "ng": <boolean>, // true if is NG
          "result": <string>, // one of OK, NG, LIMIT
          "x": <number>, // x coordinate of the centroid of the defect in the original image space
          "y": <number>, // y coordinate of the centroid of the defect in the original image space
          "vh_width": <number>, // vertical/horizontal width of the defect in the original image space
          "vh_height": <number>, // vertical/horizontal height of the defect in the original image space
          "mr_width": <number>, // minimum bounding box width of the defect in the original image space
          "mr_length": <number>, // minimum bounding box length of the defect in the original image space
          "area": <number>, // area of the defect in the original image space
          "circumference": <number> // circumference of the defect in the original image space
        }],
      }],
      # Location network only,
      "location_results": [{
        (location name) <string>: {
          "points": [
            {
              "x": number,
              "y": number,
            }
          ],
          "lines": [
            {
              "point1": {
                "x": number,
                "y": number,
              },
              "point2": {
                "x": number,
                "y": number,
              },
            }
          ],
          "circles": [
            {
```

```
            "center": {
              "x": number,
              "y": number,
            },
            "radius": number,
          }
        ]
      },
    }]
  }
}
```

Data that can be Forwarded for Each Camera:

```
{
  "part_id": <string>,
  "part_timestamp": <number>,
  "camera_id": <string>,
  "ok": <boolean>,
  "result": <string>,
  "not_enough_image_results": <boolean>,
  "image_results": {
    (image_timestamp): {
      "ok": <boolean>,
      "result": <string>,
      "ng_types": [string],
      "sequence": <string>,
      "capture_config": <string>,
      "capture_index": <number>,
      "camera_id": <string>,
      "network_results": {
        (network name): {
          # Defect network only
          "ng_stats": [{
            "name": <string>,
            "color": <string>,
            "ng": <boolean>,
            "result": <string>,
            "count": <number>,
            "segments": [{
              "ng": <boolean>, // true if is NG
              "result": <string>, // one of OK, NG, LIMIT
              "x": <number>, // x coordinate of the centroid of the defect in the original image space
              "y": <number>, // y coordinate of the centroid of the defect in the original image space
              "vh_width": <number>, // vertical/horizontal width of the defect in the original image space
              "vh_height": <number>, // vertical/horizontal height of the defect in the original image space
              "mr_width": <number>, // minimum bounding box width of the defect in the original image space
              "mr_length": <number>, // minimum bounding box length of the defect in the original image space
              "area": <number>, // area of the defect in the original image space
              "circumference": <number> // circumference of the defect in the original image space
            }],
          }],
          # Location network only,
          "location_results": [{
            (location name) <string>: {
              "points": [
                {
                  "x": number,
                  "y": number,
                }
              ],
              "lines": [
                {
                  "point1": {
                    "x": number,
                    "y": number,
                  },
                  "point2": {
                    "x": number,
                    "y": number,
                  },
                }
              ]
              "circles": [
                {
                  "center": {
                    "x": number,
                    "y": number,
                  },
                  "radius": number,
                }
              ]
            }
          }]
        }
      }
    }
  }
}
```

Data that can be Forwarded for Each Part:

```
{
  "part_id": <string>,
  "ok": <boolean>,
  "not_enough_image_results": <boolean>,
  "results": [{
    "Image_timestamp": <number>,
    "ok": <boolean>,
    "ng_types": [string],
    "sequence": <string>,
    "capture_config": <string>,
    "capture_index": <number>,
    "network": <string>,
    "camera_id": <string>,
    "ng_stats": [{
      "name": <string>,
      "color": <string>,
      "ng": <boolean>,
      "count": <number>,
      "segments": [{ // see here for explanations of fields
        "ng": <boolean>,
        "x": <number>,
        "y": <number>,
        "vh_width": <number>,
        "vh_height": <number>,
        "mr_width": <number>,
        "mr_length": <number>,
        "area": <number>,
        "circumference": <number>,
      }],
    }]
    # Location network only.
    "points": {
      (point name) <string>: [
        "x": number,
        "y": number,
      ]
    }
  }]
}
```

Part Level Result Example (json)

```
{
  "part_id": <string>,
  "part_timestamp": <number>,
  "ok": <boolean>,
  "result": <string>,
  "not_enough_image_results": <boolean>,
```

-continued

```
"image_results": {
  (image_timestamp): {
    "ok": <boolean>,
    "result": <string>,
    "ng_types": [string],
    "sequence": <string>,
    "capture config": <string>,
    "capture_index": <number>,
    "camera_id": <string>,
    "network_results": {
      (network name): {
        # Defect network only
        "ng_stats": [{
          "name": <string>,
          "color": <string>,
          "ng": <boolean>,
          "result": <string>,
          "count": <number>,
          "segments": [{
            "ng": <boolean>, // true if is NG
            "result": <string>, // one of OK, NG, LIMIT
            "x": <number>, // x coordinate of the centroid of the defect in the original image space
            "y": <number>, // y coordinate of the centroid of the defect in the original image space
            "vh_width": <number>, // vertical/horizontal width of the defect in the original image space
            "vh_height": <number>, // vertical/horizontal height of the defect in the original image space
            "mr_width": <number>, // minimum bounding box width of the defect in the original image space
            "mr_length": <number>, // minimum bounding box length of the defect in the original image space
            "area": <number>, // area of the defect in the original image space
            "circumference": <number> // circumference of the defect in the original image space
          }],
        }],
        # Location network only,
        "location_results": [{
          (location name) <string>: {
            "points": [
              {
                "x": number,
                "y": number,
              }
            ],
            "lines": [
              {
                "point1": {
                  "x": number,
                  "y": number,
                },
                "point2": {
                  "x": number,
                  "y": number,
                },
              }
            ],
            "circles": [
              {
                "center": {
                  "x": number,
                  "y": number,
                },
                "radius": number,
              }
            ]
          },
        }]
      }
    }
  }
}
```

Image Level Result Example (csv)

time, part-id, auto_ok_ng, human_ok_ng, image_count_mismatch, ng_types
07/18/2021-00:01:58, 000000000000000000001223Y178P223112000000000000, OK, OK, False,
07/18/2021-00:02:03, 000000000000000000001223Y178P223111000000000000, NG, NG, False, Defect Type 1 Defect Type 2

Figure 5:
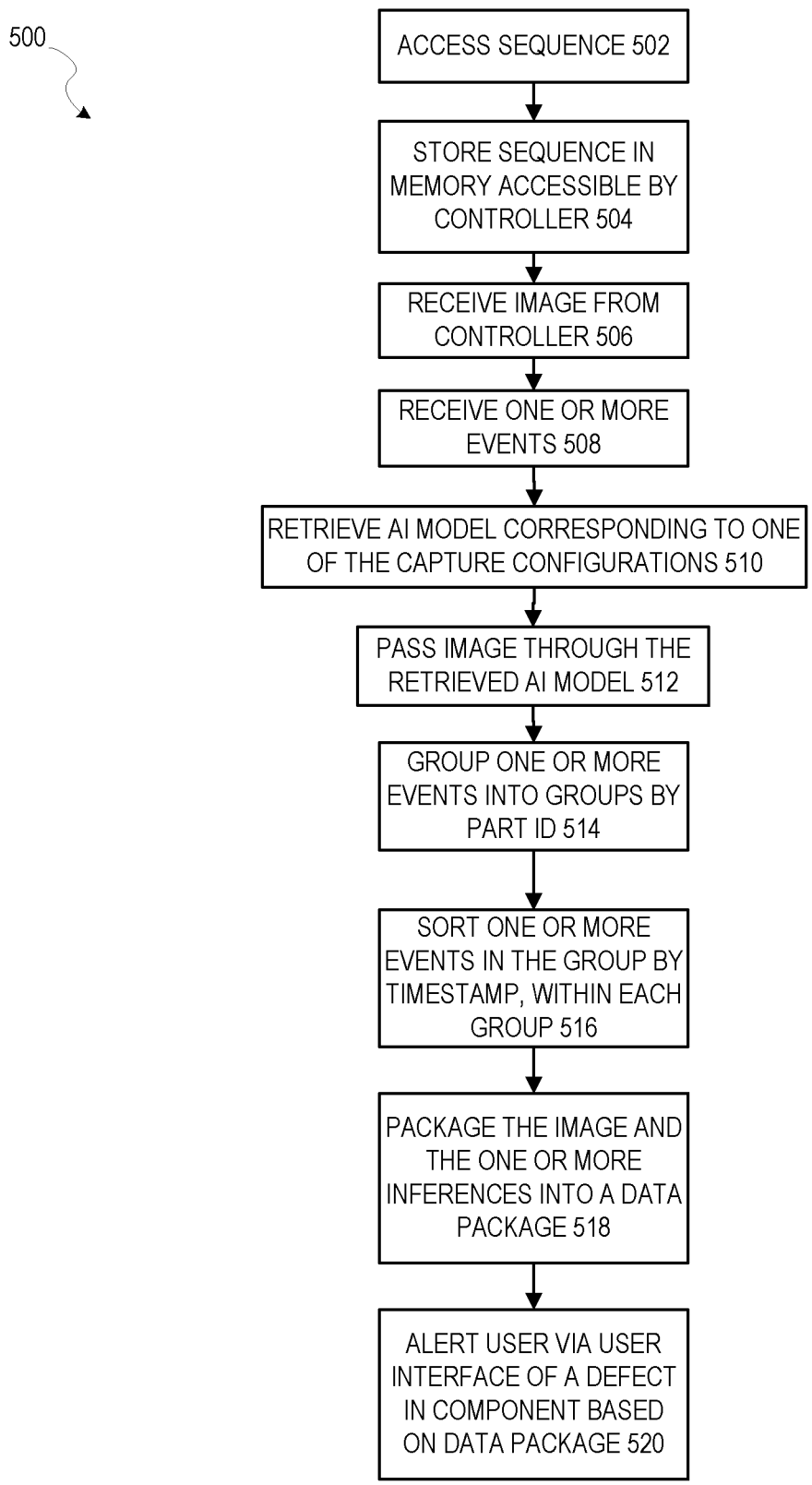
FIG. 5 is a flow diagram illustrating a method for controlling a lighting apparatus, in accordance with an example embodiment.

FIG. 5 is a flow diagram illustrating a method 500 for controlling a lighting apparatus, in accordance with an example embodiment. In one example embodiment, the method may be performed in a computer system coupled to a controller which is connected to the lighting apparatus.

At operation 502, a sequence is accessed. The sequence comprises one or more capture configurations, each of the one or more capture configurations defining an exposure time and an indication of which of the independently controllable light sources to light during an image capture process. This sequence may be defined using a user interface of the computer system, or may be obtained from another device. The sequence may organize the capture configurations in the order in which they will be fired, and there may optionally be a custom delay specified for each transition from one capture configuration to another.

At operation 504, the sequence is stored in a memory accessible by the controller. In an example embodiment, this memory is actually part of the controller itself.

At operation 506, an image captured during execution of one of the one or more capture configurations of the sequence is received from the controller. The image is captured by the at least one camera of the lighting apparatus while the lighting apparatus lights some of the plurality of independently controllable light sources in accordance with the one of the one or more capture configurations.

At operation 508, one or more events pertaining to the execution of the one or more capture configurations are received, each event including a part identification and a timestamp. It should be noted that operation 508 can actually occur at any stage in the method 500.

At operation 510, an artificial intelligence model corresponding to the one of the one or more capture configurations is retrieved. At operation 512, the image is passed through the retrieved artificial intelligence model to make one or more inferences regarding the image, the inferences pertaining to a potential defect in a component captured in the image.

At operation 514, the one or more events are grouped into groups by part identification. At operation 516, within each group, the one or more events in the group are sorted based on timestamp.

At operation 518, the image and the one or more inferences are packaged into a data package.

At operation 520, a user is alerted, via a user interface, of a defect in the component based on the one or more inferences in the data package.

Figure 6:
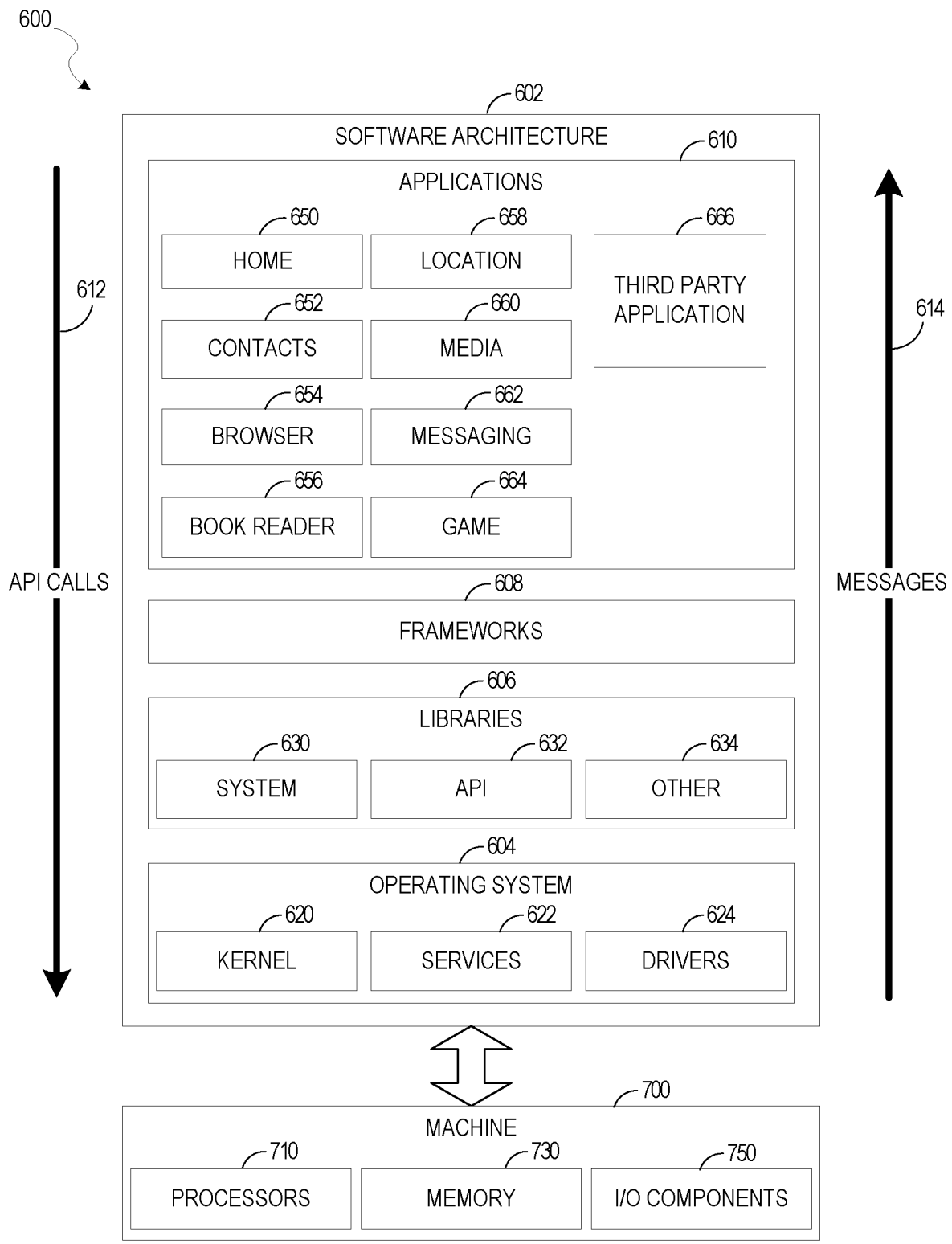
FIG. 6 is a block diagram illustrating a mobile device, according to an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
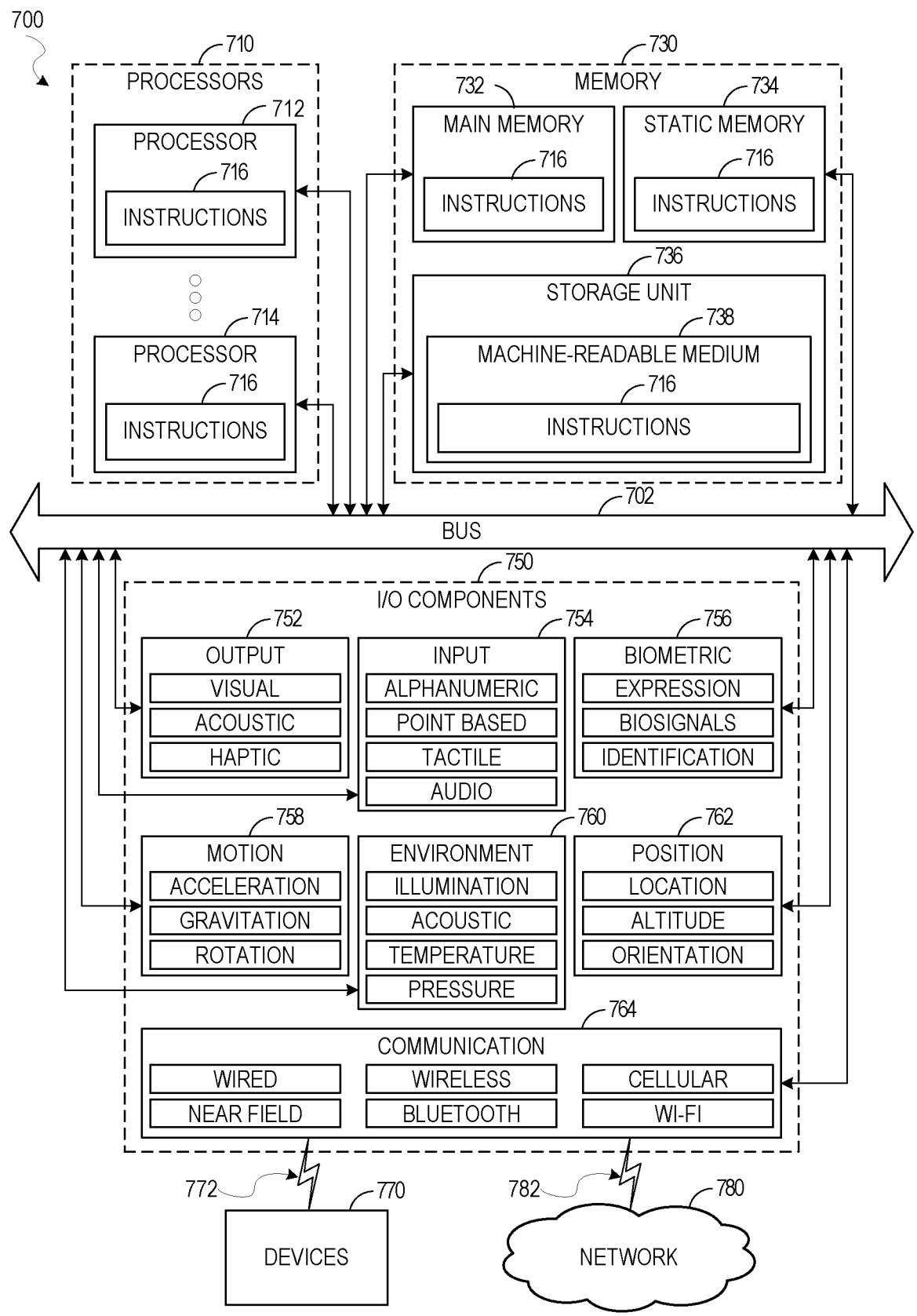
FIG. 7 is a block diagram of machine in the example form of a computer system within which instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) cause the machine 700 to perform any one or more of the methodologies discussed herein to be executed. For example, the instructions 716 may cause the machine 500 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 880 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
    a lighting apparatus including a plurality of independently controllable light sources and at least one camera;
    a controller; and
    a computer system comprising at least one hardware processor and a non-transitory computer-readable medium storing instructions that, when executed by the at least one hardware processor, cause the at least one hardware processor to perform operations comprising:
    accessing a sequence, the sequence comprising a plurality of capture configurations, each of the plurality of capture configurations defining an exposure time and an indication of which of the independently controllable light sources to light during an image capture process, each of the plurality of capture configurations having its own dedicated artificial intelligence model used only for the corresponding capture configuration and not shared with other capture configurations;
    storing the sequence in a memory accessible by the controller;
    receiving, from the controller, an image captured during execution of a first capture configuration of the plurality of capture configurations of the sequence, the image captured by the at least one camera of the lighting apparatus while the lighting apparatus lights some of the plurality of independently controllable light sources in accordance with the first capture configuration;
    accessing an artificial intelligence model corresponding only to the first capture configuration;
    passing the image through the artificial intelligence model to make one or more inferences regarding the image, the inferences pertaining to a potential defect in a component captured in the image; and
    packaging the image and the one or more inferences into a data package.

2. The system of claim 1, wherein the operations further comprise:
    alerting a user via a user interface of a defect in the component based on the one or more inferences in the data package.

3. The system of claim 1, wherein the operations further comprise:
    receiving one or more events pertaining to the execution of the plurality of capture configurations, each event including a part identification and a timestamp;
    grouping the one or more events into groups by part identification; and
    within each group, sorting the one or more events in the group based on timestamp.

4. The system of claim 3, wherein the packaging uses the sorted events in the group corresponding to the component.

5. The system of claim 1, wherein each capture configuration has at least one corresponding artificial intelligence model that is not shared with another capture configuration.

6. The system of claim 3, wherein the operations further comprise:
    encoding the image and the first capture configuration in a first data structure; and
    storing the first data structure in a first shared memory shared between an image processing component that performs the receiving of the image and an image analysis component that performs the accessing of the artificial intelligence model and the passing of the image.

7. The system of claim 6, wherein the operations further comprise:
encoding the one or more inferences into a second data structure; and
storing the second data structure in a second shared memory shared between the image analysis component and a central processing component that performs the grouping and sorting.

8. The system of claim 7, wherein the operations further comprise:
storing the data package in a third shared memory shared between the central processing component and a user interface in which a defect in the component based on the one or more inferences may be displayed.

9. A method comprising:
accessing a sequence, the sequence comprising a plurality of capture configurations, each of the plurality of capture configurations defining an exposure time and an indication of which of a plurality of independently controllable light sources to light during an image capture process, each of the plurality of capture configurations having its own dedicated artificial intelligence model used only for the corresponding capture configuration and not shared with other capture configurations;
storing the sequence in a memory accessible by the controller;
receiving, from the controller, an image captured during execution of a first capture configuration of the plurality of capture configurations of the sequence, the image captured by at least one camera of a lighting apparatus while the lighting apparatus lights some of the plurality of independently controllable light sources in accordance with the first capture configuration;
accessing an artificial intelligence model corresponding only to the first capture configuration;
passing the image through the artificial intelligence model to make one or more inferences regarding the image, the inferences pertaining to a potential defect in a component captured in the image; and
packaging the image and the one or more inferences into a data package.

10. The method of claim 9, further comprising:
alerting a user via a user interface of a defect in the component based on the one or more inferences in the data package.

11. The method of claim 9, further comprising:
receiving one or more events pertaining to the execution of the plurality of capture configurations, each event including a part identification and a timestamp;
grouping the one or more events into groups by part identification; and
within each group, sorting the one or more events in the group based on timestamp.

12. The method of claim 11, wherein the packaging uses the sorted events in the group corresponding to the component.

13. The method of claim 9, wherein each capture configuration has at least one corresponding artificial intelligence model that is not shared with another capture configuration.

14. The method of claim 11, further comprising:
encoding the image and the first capture configuration in a first data structure; and
storing the first data structure in a first shared memory shared between an image processing component that performs the receiving of the image and an image analysis component that performs the accessing of the artificial intelligence model and the passing of the image.

15. The method of claim 14, further comprising:
encoding the one or more inferences into a second data structure; and
storing the second data structure in a second shared memory shared between the image analysis component and a central processing component that performs the grouping and sorting.

16. The method of claim 15, further comprising:
storing the data package in a third shared memory shared between the central processing component and a user interface in which a defect in the component based on the one or more inferences may be displayed.

17. A non-transitory machine-readable storage medium having embodied thereon instructions executable by one or more machines to perform operations comprising:
accessing a sequence, the sequence comprising a plurality of capture configurations, each of the plurality of capture configurations defining an exposure time and an indication of which of a plurality of independently controllable light sources to light during an image capture process, each of the plurality of capture configurations having its own dedicated artificial intelligence model used only for the corresponding capture configuration and not shared with other capture configurations;
storing the sequence in a memory accessible by the controller;
receiving, from the controller, an image captured during execution of a first capture configuration of the plurality of capture configurations of the sequence, the image captured by at least one camera of a lighting apparatus while the lighting apparatus lights some of the plurality of independently controllable light sources in accordance with the first capture configuration;
accessing an artificial intelligence model corresponding only to the first capture configuration,
passing the image through the artificial intelligence model to make one or more inferences regarding the image, the inferences pertaining to a potential defect in a component captured in the image; and
packaging the image and the one or more inferences into a data package.

18. The non-transitory machine-readable storage medium of claim 17, wherein the operations further comprise:
alerting a user via a user interface of a defect in the component based on the one or more inferences in the data package.

19. The non-transitory machine-readable storage medium of claim 17, wherein the operations further comprise:
receiving one or more events pertaining to the execution of the plurality of capture configurations, each event including a part identification and a timestamp;
grouping the one or more events into groups by part identification; and
within each group, sorting the one or more events in the group based on timestamp.

20. The non-transitory machine-readable storage medium of claim 19, wherein the packaging uses the sorted events in the group corresponding to the component.

* * * * *